Patented July 12, 1949

2,476,069

UNITED STATES PATENT OFFICE 2,476,069

DELUSTERING COPOLYMER FILAMENTS

James E. Snyder, Akron, Ohio, assignor to Wingfoot Corporation, Akron, Ohio, a corporation of Delaware No Drawing. Application February 8, 1947, Serial No. 727,297

8 Claims. (Cl. 8—130.1)

This invention relates to a method of removing the glossy finish from copolymer filaments. More particularly, the invention relates to the delustering of fibers of copolymers of vinyl compounds and vinylidene chloride by treatment with a suitable solvent or partial solvent, which causes swelling of the filaments, followed by a treatment which reduces the swelling.

Copolymers of a high proportion of vinylidene chloride and a small proportion of vinyl chloride or a vinyl ester are particularly useful in practicing this invention. Monofilaments prepared by extruding the molten material through an orifice, or suitable die, have glossy surfaces which are objectionable if the filaments are to be fabricated into screen cloth, particularly for windows and doors, where diffusion or reflection of sunlight would obstruct the vision.

One purpose of this invention is to prepare screens which do not obscure vision by reflection of the sunlight from the filaments. A further purpose of this invention is to provide a method of delustering the glossy surface on copolymer fibers, and in particular copolymers of 70 to 95 percent of vinylidene chloride and 30 to 5 percent of a vinyl halide or ester.

Suitable vinyl esters are those of monocarboxylic acids, such as vinyl acetate, vinyl propionate, vinyl butyrate, and other vinyl esters of fatty acids. Vinyl halides, including vinyl chloride, vinyl fluoride and vinyl bromide may be used in lieu of all or part of the vinyl ester. Mixtures of vinyl halides and mixtures of vinyl esters may also be used in the preparation of suitable vinylidene chloride copolymers for use in practicing this invention.

In accordance with this invention, it has been found that extruded filaments of a copolymer of 70 to 95 percent of vinylidene chloride and 30 to 5 percent of vinyl compound may be substantially swelled by the action of liquids which are solvents or partial solvents for the copolymer, and delustered by treatment which reduces the swelling. The solvent or partial solvent causes the copolymer to swell by reason of the diffusion of the solvent into the copolymer fiber or the partial solution thereof. Subsequent treatment of the swollen fiber, for example with steam or boiling water, causes the filament surface to lose its luster. The action of the delustering agent may be that of precipitating the copolymer from its gelled state on the surface of the filament. Screens formed from such improved fibers no longer reflect transmitted light and accordingly are not characterized by haziness of vision through the screens.

Although any partial solvent which induces swelling of the fiber may be used, those which include ketone groups are preferred. Among the preferred solvents are methyl ethyl ketone, cyclohexanone, mesityl oxide, isophorone, phlorone and phorone. Mixtures of ketones, or mixtures of a ketone with other miscible solvents, may also be used to swell the vinylidene chloride copolymer filaments. Suitable miscible solvents are butoxy glycol phthalate, butyl phthalyl butyl glycolate, chloroethyl phosphate, dibenzyl sebacate, dibutyl phthalate, dibutyl sebacate, diethyl phthalate, dimethyl cyclohexyl phthalate, diphenyl phthalate, dioctyl phthalate, dioctyl sebacate, ethoxy glycol phthalate, esterified coconut oil, tricresyl phosphate, trioctyl phosphate, tri-p-tert. butyl phenyl phosphate, and similar compounds.

The actual delustering is achieved upon reduction of the swelling, although the exact mechanism of the delustering has not been definitely ascertained. Any agent which reduces the swelling also produces the delustering effect. Liquids which are not solvents for the fiber but which are miscible with the liquid swelling agent will cause the entrapped swelling agent to diffuse out of the fiber. Best results are obtained by treating the swollen fiber with a combination of heat and a liquid agent adapted to reduce the swelling. Although hot water and steam are preferred, other agents, such as alcohol or aqueous salt solutions are useful.

A preferred method of practicing this invention involves the use of cyclohexanone or mixtures of cyclohexanone with methyl ethyl ketone for swelling and steam for reducing the swelling. A mixture of 60 to 70 percent of cyclohexanone and 40 to 30 percent methyl ethyl ketone at a temperature of 60° C. has been found to be very effective in delustering pre-fabricated screen by dipping the screen in the solvent bath for 15 seconds followed by a slight mechanical shaking action to break the liquid films across the interstices, and then exposing the screen to an atmosphere of steam for a sufficient period of time to reduce the swelling and produce the delustered effect.

This invention is particularly adaptable to continuous operations and may be used to deluster filaments prior to fabrication of articles therefrom, or to deluster fabricated screens. The filaments may be delustered by passing a continuous filament through a bath of the desired swelling agent and through a steam chamber and then rewinding the delustered filament on a suitable reel. Similarly, fabricated screen of any desired width may be passed continuously through a suitable vat of the solvent and a steam chamber, followed by rewinding, or any desired fabricating operation.

Further details of this invention are set forth with respect to the following specific examples:

Example 1

An extruded filament of a copolymer of approximately 90 percent vinylidene chloride and 10 percent vinyl chloride was passed from a spool continuously through a bath of cyclohexanone at a temperature of 115° C. The filament was passed at a rate which effected an immersion of approximately one second and was then taken through boiling water. The resulting filament was found to be substantially delustered.

Example 2

A fabricated screen made of fibers of a copolymer of approximately 90 percent vinylidene chloride and 10 percent vinyl chloride, the fibers being 0.015 inch in diameter, was passed through a bath of 35 percent methyl ethyl ketone and 65 percent cyclohexanone maintained at a temperature of 60° C. The dip period was about 15 seconds; upon removal of the screen from the solvent it was shaken to remove the excess solvent and then exposed to steam until the surface gloss disappeared. The resulting screen was found to be entirely satisfactory and sunlight was not objectionably reflected from the fiber surfaces.

Example 3

Methyl ethyl ketone was used to deluster a screen made of vinylidene copolymer fiber by the method described in the preceding example. It was found that a two minute dip at the boiling point of the solvent followed by the steam treatment was effective to satisfactorily deluster the screen fibers.

Although the invention has been described with respect to specific examples it is not intended that the details thereof shall be construed as limitations upon the scope of the invention except to the extent incorporated in the following claims.

I claim:

1. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of a swelling agent from the group consisting of cyclohexanone and a mixture of cyclohexanone and methyl ethyl ketone, for a period of between 1 second and 15 seconds, and then immediately thereafter subjecting the treated fibers to the action of a treating agent selected from the group consisting of water and steam.

2. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of a swelling agent from the group consisting of cyclohexanone and a mixture of cyclohexanone and methyl ethyl ketone, for a period of between 1 second and 15 seconds, and then immediately thereafter subjecting the treated fibers to the action of water.

3. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of a swelling agent from the group consisting of cyclohexanone and a mixture of cyclohexanone and methyl ethyl ketone, for a period of between 1 second and 15 seconds, and then immediately thereafter subjecting the treated fibers to the action of an atmosphere of steam.

4. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of a swelling agent from the group consisting of cyclohexanone and a mixture of cyclohexanone and methyl ethyl ketone, for a period of between 1 second and 15 seconds, and then immediately thereafter subjecting the treated fibers to the action of hot water.

5. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of cyclohexanone for a period of between 1 second and 15 seconds, and then immediately thereafter subjecting the treated fibers to the action of water.

6. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of a mixture of 30 to 40% of methyl ethyl ketone and 70 to 60% of cyclohexanone for a period of between 1 second and 15 seconds, and then immediately thereafter subjecting the treated fibers to the action of water.

7. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of a mixture of 30 to 40% of methyl ethyl ketone and 70 to 60% of cyclohexanone heated to a temperature above 60° C. for a period of between 1 second and 15 seconds, and then immediately thereafter subjecting the treated fibers to the action of water.

8. A method of treating fibers of a copolymer of 70 to 95% of vinylidene chloride and 30 to 5% of a compound of the group consisting of vinyl chloride and vinyl esters of monocarboxylic acids which comprises subjecting the fibers to the action of a bath consisting of cyclohexanone heated to a temperature above 90° C. for a period of between 1 second and 15 seconds, and then immediately thereafter subjecting the treated fibers to the action of water.

JAMES E. SNYDER.

REFERENCES CITED

The following references are of record in the file of this patent:

UNITED STATES PATENTS

| Number | Name | Date |
|---|---|---|
| 2,073,629 | Ellis | Mar. 16, 1937 |
| 2,233,442 | Wiley | Mar. 4, 1941 |
| 2,277,782 | Rugeley | Mar. 31, 1942 |
| 2,347,508 | Rugeley et al. | Apr. 25, 1944 |